US011314556B2

(12) United States Patent
Solheim et al.

(10) Patent No.: US 11,314,556 B2
(45) Date of Patent: Apr. 26, 2022

(54) SHADOWING LOCAL ON-PREMISES INFORMATION TO A CLOUD-BASED COMPUTING SYSTEM

(71) Applicant: MICROSOFT TECHNOLOGY LICENSING, LLC, Redmond, WA (US)

(72) Inventors: Helge Grenager Solheim, Oslo (NO); Kathrine Hammervold, Oslo (NO); Kjetil Krogvig Bergstrand, Kolbotn (NO); Morgan Larsson, Asker (NO); Johannes Gehrke, Bellevue, WA (US); Niels Petter Rasch-Olsen, Heggedal (NO)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 14/194,669

(22) Filed: Mar. 1, 2014

(65) Prior Publication Data

US 2015/0248435 A1    Sep. 3, 2015

(51) Int. Cl.
 *G06F 9/50* (2006.01)
(52) U.S. Cl.
 CPC ................... *G06F 9/5072* (2013.01)
(58) Field of Classification Search
 CPC ........ G06F 9/5072; G06F 17/30; G06F 16/00; G06Q 10/101
 USPC .................. 707/610, 620; 715/751
 See application file for complete search history.

(56) References Cited

U.S. PATENT DOCUMENTS

| 8,417,938 B1 | 4/2013 | Considine et al. |
| 2010/0027552 A1 | 2/2010 | Hill |
| 2010/0332401 A1* | 12/2010 | Prahlad ................. G06F 3/0649 705/80 |
| 2011/0137919 A1* | 6/2011 | Ryu .................... G06F 16/9024 707/748 |
| 2011/0218964 A1 | 9/2011 | Hagan et al. |
| 2012/0210247 A1* | 8/2012 | Khouri ................ G06Q 10/101 715/751 |
| 2012/0281706 A1 | 11/2012 | Agarwal et al. |
| 2012/0324069 A1 | 12/2012 | Nori et al. |

(Continued)

FOREIGN PATENT DOCUMENTS

WO    2011109416 A2    9/2011

OTHER PUBLICATIONS

Https://en.wikipedia.org/w/index.php?title=Google_Docs,_Sheets,_Slides_and_Forms&oldid=595171815; Feb. 12, 2014; pp. 1-5.*

(Continued)

*Primary Examiner* — Hosain T Alam
*Assistant Examiner* — Tracy M McGhee

(57) ABSTRACT

Shadowing of local or remote information to cloud-based computing systems is provided. As content and activities associated with content (e.g., content modification activities, content communication activities, people associated with content, social networking associated with content, etc.) are developed at a local on-premises computing system that is remote from the cloud-based computing system responsible for maintaining the same content and content activities, the local content and activities are shadowed to the cloud-based system at a regular frequency so that the content and activities at the cloud-based system are synchronized and merged with the content and activities at the local system.

17 Claims, 8 Drawing Sheets

(56) References Cited

U.S. PATENT DOCUMENTS

2013/0039360 A1    2/2013   Manian et al.
2013/0204849 A1    8/2013   Chacko

OTHER PUBLICATIONS

Google Drive; Jan. 2013; http://web.archive.org/web/20130131194224/http://en.wikipedia.org/wiki/Google_Drive.*

Google Drive; Jan. 2013 (http://web.archive.org/web/20130131194224/http://en.wikipedia.org/wiki/Google_Drive) (Year: 2013).*

"Google Docs, sheets and slides—Wikipedia, the free encyclopedia", Published on: Feb. 26, 2014 Available at: http://en.wikipedia.org/w/index.php?title=Google_Docs,_Sheets,_and_Slides&oldid=597178278.

"International Search Report and Written Opinion Issued in PCT Patent Application No. PCT/US2015/017864", dated Jun. 25, 2015, 8 Pages.

"Exchange Server 2013 Hybrid Deployments", Published on: Apr. 26, 2013 Available at: http://technet.microsoft.com/en-us/library/jj200581(v=exchg.150).aspx.

Hajjat, et al., "Cloudward Bound: Planning for Beneficial Migration of Enterprise Applications to the Cloud", In Proceedings of the ACM SIGCOMM Conference on Applications, Technologies, Architectures, and Protocols for Computer Communications, Aug. 30, 2010, 12 pages.

"Secure Cloud Access using CipherGraph Cloud Access Gateway", Published on: Oct. 2, 2013 Available at: http://www.ciphergraph.com/secure-access-to-clouds-and-datacenters/.

"Second Written Opinion Issued in PCT Application No. PCT/US2015/017864", dated Jan. 14, 2016, 6 Pages.

International Preliminary Report on Patentability Issued in PCT Application No. PCT/US2015/017864, dated May 18, 2016, 7 Pages.

"Office Action Issued in European Patent Application No. 15716193.6", dated Dec. 13, 2017, 8 Pages.

"Google Drive", Retrieved From: http://en.wikipedia.org/w/index.php?title=Google_Drive&oldid=597408454, Feb. 27, 2014, 10 Pages.

"First Office Action Issued in Chineese Patent Application No. 201580011545.5", dated Nov. 19, 2018, 14 Pages.

"Summons to Attend Oral Proceedings Issued in European Patent Application No. 15716193.6", dated Aug. 26, 2019, 10 Pages.

"Second Office Action Issued In Chinese Patent Application No. 201580011545.5", dated Jul. 8, 2019, 10 Pages.

"Office Action Issued in Chinese Patent Application No. 201580011545.5", dated Nov. 20, 2019, 9 Pages.

"Summons to Attend Oral Proceedings Issued in European Patent Application No. 15716193.6", dated Jan. 22, 2020, 10 Pages.

* cited by examiner

SHADOWING LOCAL ON-PREMISES INFORMATION TO A CLOUD-BASED COMPUTING SYSTEM

BACKGROUND

Information users and workers generate, edit, send and receive enormous amounts of electronic information items, for example, documents, images, electronic communications, data sets, and the like. In modern times, a typical information user or worker may be working with information items in a hybrid environment where some of the information is generated, edited, received or sent at, to or from a local on-premises computing system (e.g., place of business, school, home, etc.), and where some of the information is generated, edited, received, or sent at, to or from a remote computing system (also referred to herein as a "cloud" system) via a distributed computing network such as the Internet. In a typical case, a user operating in such a hybrid system desires to store local on-premises information to the remote cloud system so that his/her information ultimately may be stored, maintained, and accessed at a central location. Unfortunately, in the case of many enterprises, for example, businesses, schools, social networking systems, and the like, data firewalls and authentication systems make information communication from local systems to cloud-based systems difficult. Even when communication of information is allowed, an increase in latency is typically experienced, and thus, the ability to access data quickly from the cloud-based system is diminished.

Such issues often lead users to maintain information silos (where some information types are maintained at one or both locations separately) at both the local on-premises and the remote cloud-based systems. Users also often duplicate information at both locations and duplicate computing system settings at both locations. Consequently, they often have to frequently ensure information, activities and settings from the local on-premises systems are merged with corresponding information, activities and settings at the remote cloud-based system. It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing shadowing of local or remote information to cloud-based computing systems. According to embodiments, as content and activities associated with content (e.g., content modification activities, content communication activities, people associated with content, social networking associated with content, etc.) are developed at a local on-premises computing system that is remote from the cloud-based computing system responsible for maintaining the same content and content activities, the local content and activities are shadowed to the cloud-based system at a regular frequency so that the content and activities at the cloud-based system are synchronized and merged with the content and activities at the local system.

As content and activities are interacted with and/or occur, they are passed through an analysis and aggregation system at the local system for generating an enterprise graph of relationships between content items and associated activities. Information is periodically pulled from the enterprise graph and is sent to the cloud-based system via an information push client at the local system. At the cloud-based system an information receiver application programming interface (API) receives the on-premises information. The local on-premises information is passed through a synchronization module/system where the received local on-premises information is synchronized with corresponding content and activities already present at the cloud-based system. If content and content activities are sent to the cloud-based system directly by a user operating outside the on-premises system, such content and activities may be stored at the cloud-based system and may be similarly synchronized and merged with corresponding information that may subsequently come in from the on-premises system.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings which are incorporated in and constitute a part of this disclosure, illustrate various embodiments of the present invention.

DETAILED DESCRIPTION

Figure 1:
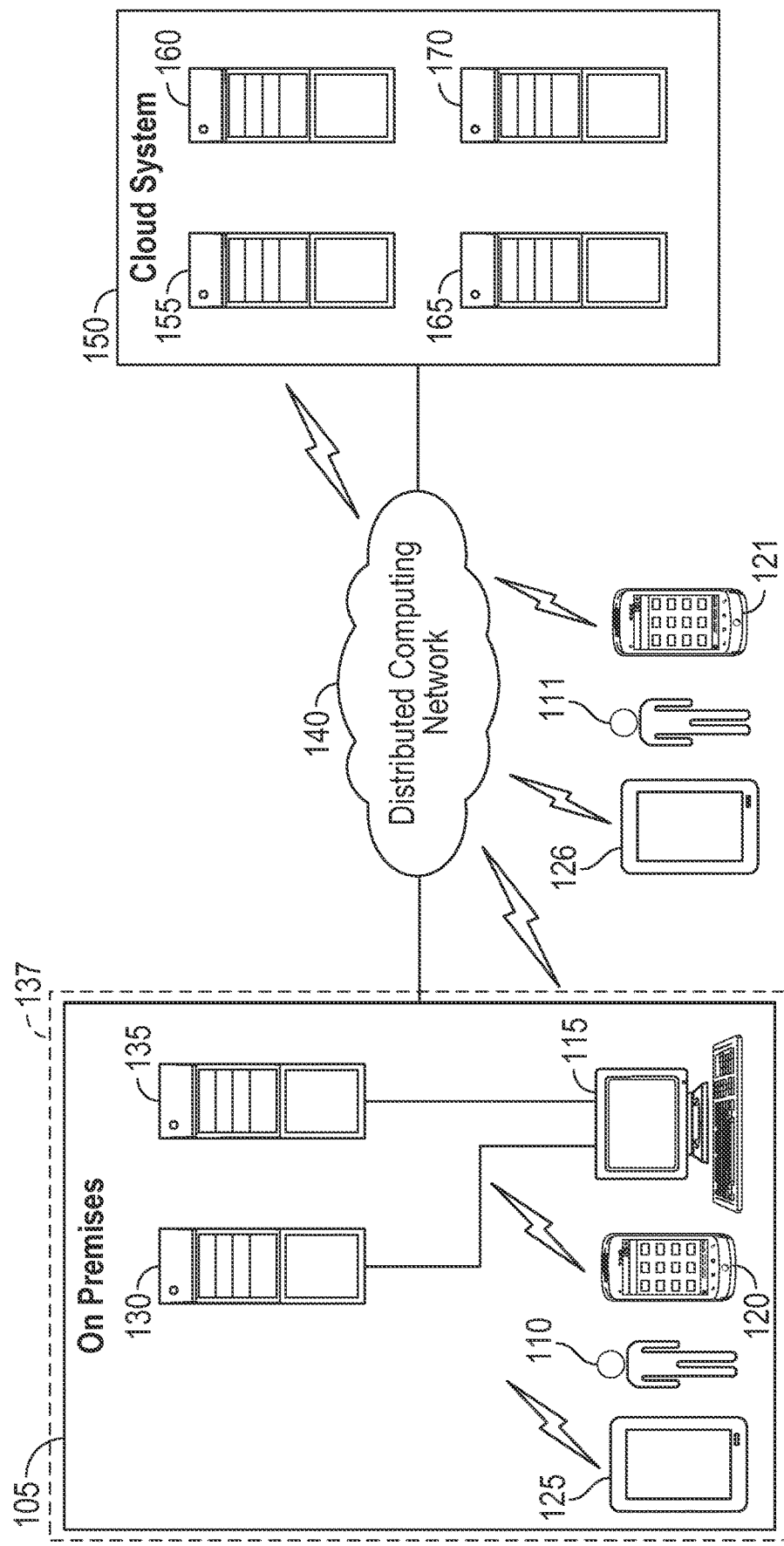
FIG. 1 is a block diagram illustrating interaction between a local on-premises computing system and a remote cloud-based computing system.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As briefly described above, embodiments of the present invention are directed to providing shadowing of local or remote information to cloud-based computing systems. Content may be generated, modified, and interacted with (resulting in activities associated with the content) at a local on-premises computing system, at a cloud-based computing system, or at a combination of both. For example, a user may generate a document at the local on-premises computing system that ultimately needs to be passed to the cloud-based system for storage, or the user may generate or modify content and save the content directly to a storage location at the cloud-based computing system. In addition, information may be generated, modified, and interacted with outside the on-premises system, for example, via a mobile computing device, and may be sent directly to the cloud-based system.

According to embodiments, information may be pushed directly from the on-premises system to the cloud-based system where it may be compared with and, in some cases, merged with information already resident at the cloud-based system. According to one embodiment, processing may be performed on-premises, and on-premises systems may extract only those portions of a given information item (e.g., document) that are needed at the cloud-based system for information comparison, merger and indexing. Thus, processing and memory costs associated with such activities may be incurred on premises as opposed to at the cloud-based system. The information may be indexed at the cloud-based system for future searching. Alternatively, the information at the on-premises system may stay at the on-premises system, and metadata or other identifying information for the on-premises information may be passed to and indexed at the cloud-based system. Thus, processing and memory capacity at the cloud-based system is conserved, and future searching on a cloud-based index may direct a searching user to information actually stored on-premises.

FIG. 1 is a block diagram illustrating interaction between a local on-premises computing system and a remote cloud-based computing system. Three computing systems are illustrated in FIG. 1 for showing how data of various types can be generated, modified, and interacted with within the confines of an on-premises enterprise, or how data may be generated, modified and interacted with at a cloud-based computing system, or how content may be generated, modified or otherwise interacted with by a user operating outside either the on-premises system or the cloud-based. The on-premises system 105 is illustrative of an enterprise-like computing system that may be operated by a business, school, social networking system, or any other organization maintaining a computing system for use by its members, employees, family members, and the like. The on-premises system 105 may also be illustrative of a home based system in which a user operates a computing system with various protective systems in place, for example, firewalls and authentication models.

Referring to the on-premises system 105, a user 110 is illustrated in association with a variety of computing devices, for example, a tablet-style computer 125, a desktop or laptop style computer 115, or a handheld computing device 120, such as a smart phone. According to the on-premises computing system 105, the user 110 may generate, modify, and otherwise interact with data of various types, for example, documents, data sets, images, electronic communications, and the like, and such content may be generated at, stored at and processed at one or more locations within the on-premises system including client side processing and storage at the computing devices 115, 120, 125 or at server-side processing and storage systems maintained at one or more on-premises server systems 130, 135.

In order to protect from unauthorized or malicious content or content interaction into the on-premises system 105 or out of the on-premises system 105, a series of protective systems may be installed for example, a firewall 137, and/or one or more authentication models or systems. As understood by those skilled in the art, the firewall 137 may prevent the introduction of unauthorized or malicious content or information into the computing systems of the on-premises system 105, and similarly, an authentication model or system may be utilized for preventing unauthorized access to data maintained on the on-premises computing systems and for preventing unauthorized transmission of data from the on-premises computing systems.

The user 111 is illustrative of a user operating outside the protected on-premises system 105 utilizing one or more computing devices, for example, the tablet-style computing device 126, the handheld computing device 121, or any other suitable computing device with which the user may generate, modify or otherwise interact with content. For example, the user 111 may be an employee or other member of the on-premises enterprise, but may be operating outside the on-premises computing system working at his/her home or from a remote location while traveling, and the like. Otherwise, the user 111 may be illustrative of any user that may generate, modify or otherwise interact with information external to an on-premises system 105 or a cloud-system 150, described below.

The cloud system 150 is illustrative of a remote computing system at which computing processing, computing software, and memory storage may be maintained for receiving, processing, and storing content from a variety of sources including from the on-premises computing system 105 and from the external user 111 operating outside the on-premises system 105. For example, the cloud system 150 may include a variety of computing software applications, for example, word processing applications, spreadsheet applications, slide presentation applications, notes taking applications, data storage and processing applications, shared resources applications, and the like.

According to one embodiment, content generated, modified or otherwise interacted with at the on-premises system 105 or via the external computing devices 126, 121, and the like may be passed to the cloud system 150 via a distributed computing network 140, such as the Internet for storage and maintenance at the cloud system 150. That is, the cloud system 150 may serve as a data repository at which data may be stored and from which data may be retrieved by client side devices operated remotely from the cloud system 150 at the on-premises system 105 or at a computing system 121, 126 operating outside the on-premises system 105. Alternatively, a variety of computing processing and software systems, as described above, may be operated at the cloud system 150, and users operating at the on-premises system 105 or external to the on-premises system 105 may generate, modify and otherwise interact with content of various types at the cloud-based system through computing processing, software systems, and memory storage systems operated and maintained at the cloud system 150. In this case, computing devices operating at the on-premises system 105 or external to the on-premises system 105 may operate as thin clients for communicating with computing systems and software applications operated at the cloud system 150 in an online computing environment.

In addition to the foregoing, according to embodiments, an "on-premises" system 105 and/or and external user 111

(and associated computing functionality/systems) may be instances of a cloud-based computing system 150. That is, the on-premises system 105 illustrated and described above may be in the form of another cloud-based system operating apart from the described cloud-based system 150 wherein information from the on-premises system 105 is shadowed to the cloud-based system 150 as described herein, but where both systems are, in fact, cloud-based. In one case, the on-premises system 105 may be a private cloud installation operated by an enterprise, or the on-premises system 105 may be another type of cloud solution operated at the same location as the cloud-based system 150 or remotely from the cloud-based system 150 at a different cloud system. Likewise, the user 111 and associated computing systems may be illustrative of a user operating from a different cloud-based system from the cloud-based system 150 or from a private or separate cloud installation at the same cloud-based system 150. As should be appreciated, shadowing information from an on-premises system to a cloud based system works in the same manner as described herein regardless of the whether the on-premises system is a local non-cloud-based system or a cloud-based solution as described above.

From the foregoing, it will be appreciated that various content generation, modification and interactions scenarios are enabled. For example, a user 110 operating at the on-premises system 105 may generate, modify and interact with a document on an on-premises computer 115, followed by storing the document on an on-premises server 130. Subsequently, the user may wish to pass the stored document outside the on-premises system 105 to the cloud system 150 for storage on a cloud system server 155. Likewise, the user 111 operating at a remote location outside an on-premises system 105 may generate, modify, or otherwise interact with a document via a remotely operating computing system 121, 126 at which the content is stored. Subsequently, the user may wish to pass the stored content from the remotely operated computing system 121, 126 to a cloud system server 155, 160, 165, 170 for storage.

According to an alternate scenario, a user at either the on-premises system 105 or external to the on-premises system 105 may desire to log onto a computing system and associated software application at the cloud system 150 for generating, modifying or otherwise interacting with content directly at the cloud system 150, thus bypassing the on-premises system 105 or the local computing functionality of the local computing devices 121, 126. According to this scenario, such users may log on to an online version of a desired software application at the cloud system 150 via a web interface operated over a distributed computing network 140, such as the Internet, for generating, modifying or otherwise interacting with content, for example, a document, which will then be stored at a cloud system 150 storage medium.

According to yet another operating scenario, a user at an on-premises computing system 105, or a user 111 operating external to an on-premises system 105 may operate in a hybrid environment in which he/she generates, modifies, or otherwise interacts with content both external to the cloud system 150 and directly with the cloud system 150. For example, a user 110 at the on-premises system 105 may generate a document that is stored at an on-premises server 130, but the user may subsequently desire to pass the document to the cloud system 150 where the document may be modified or otherwise interacted with by another user operating at another on-premises system 105 or another user external to an on-premises system 105 with which the first user is collaborating on the content. According to any of these scenarios, a need often exists for synchronizing and merging content generated, modified or otherwise interacted with external to the cloud system 150 with like content generated, modified, or interacted with at the cloud system 150.

Consider for example a user generates a quarterly sales report on an on-premises computing system 125 and stores the quarterly sales report on an on-premises server 130. If the quarterly sales report is to be accessed and possibly modified or interacted with by other users outside the on-premises system 105, a need may exist for storing the sales report on a cloud system server 155 where it may be accessed by other users. If the sales report is passed to the cloud system 150 for storage and subsequently is accessed by another user, the other user may make changes to the sales report and save the revised sales report at the cloud system 150. Simultaneously, the user operating at the on-premises system may make revisions to the original sales report, and owing to a latency period between a time when the user attempts to pass the example sales report to the cloud system 150 and when the document actually arrives at the cloud system 150 having passed through a firewall 137 and/or authentication system, versioning conflicts may have been created between the document author and the subsequent user accessing and interacting with the document at the cloud system 150. According to embodiments, contents of the sales report need to be indexed at the cloud system 150 for version control and subsequent searching. However, as will be described herein, processing required for indexing the contents of the sales report may be performed at an on-premises client application, on-premises server or at the cloud system 150.

For another example, consider a search operation directed to systems at both the on-premises system 105 and the cloud system 150. Owing to communication difficulties or communication latency between the on-premises system 105 and the cloud system 150, alignment on large search operations that require pre-query processing may be difficult, such as search rank alignment, refiner operations (e.g., for editing search content), search results duplicate removal, and the like.

Figure 2:
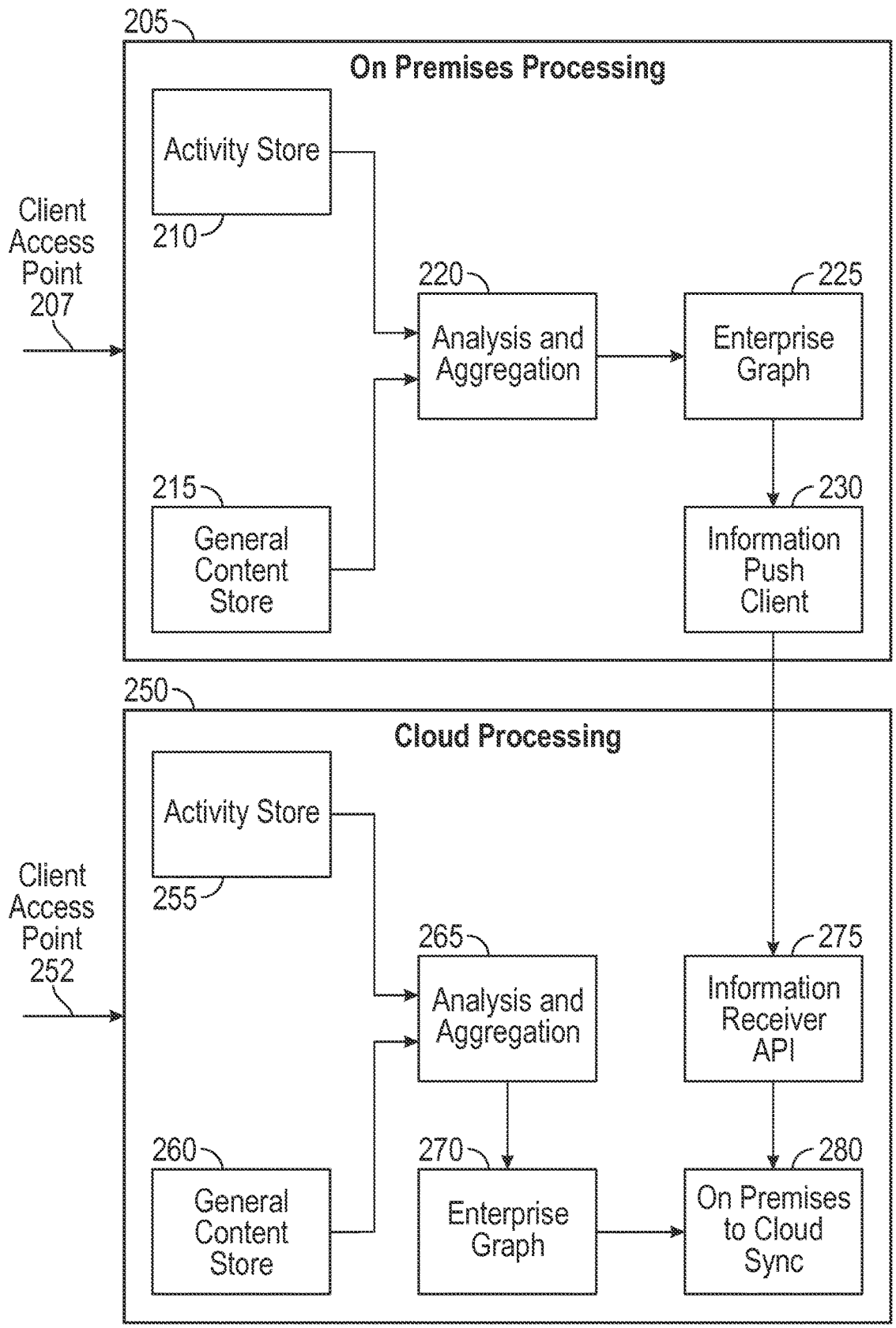
FIG. 2 is a block diagram illustrating a system for shadowing local on-premises information to a remote cloud-based computing system.

As illustrated in FIG. 2, according to embodiments, systems may be operated at both an on-premises system 105 and at a cloud system 150 for shadowing content and activities associated with content from an on-premises system 105 to a cloud system 150 for synchronizing and merging information generated, modified or otherwise interacted with at the on-premises system 105 with corresponding information generated, modified, or interacted with at the cloud system 150. Referring to FIG. 2, a content shadowing system 205 is illustrative of a system operating at the on-premises system 105 (illustrated in FIG. 1) for shadowing content and activities associated with content from the on-premises system 105 to the cloud system 150. The system 250, illustrated in FIG. 2 is illustrative of a corresponding system operating at the cloud system 150 for receiving shadowed content and corresponding activities from the on-premises system 105 and for synchronizing and merging received information with corresponding content and content activities stored at the cloud system 150. In addition, the cloud-based system 250 may also enable the receipt of content and content activities directly from a user 111 operating outside an on-premises system 105 where such information also may be synchronized and merged with other content and content activities maintained at the cloud system 150 or received from the on-premises system 105.

Referring still to the on-premises shadowing system 205, a client access point 207 is illustrative of an access point for allowing an on-premises computing system to call on the functions of the shadowing system 205 for causing information to be pushed to the cloud system 150, as described below. For example, an application may operate at the on-premises system 105 that is responsible for periodically causing the shadowing system 205 to process content and content activities for passing the content and content activities to the cloud system 150. Alternatively, a user 110 at the on-premises system may periodically manually command information to be sent to the cloud system 105 by accessing the shadowing system 205.

A general content store 215 is illustrative of a storage medium at which any type of content may be stored and from which the content may be retrieved for processing. For example, the general content store 215 may be a server 130, 135, or may be a local memory storage medium at a computing device 115, 120, 125. Content stored at the general content store 215 may include documents of any type, data sets, images, electronic communications, and the like that may be pushed to the cloud system 150, as described herein.

The activity store 210 is illustrative of a storage of activities associated with any given content item. Activities that may be stored in the activity store 210 include metadata indicating information about a content type, for example, document author, document editor, document creation date, document revision date, and the like. Other activity information may include information on various users associated with the document, for example, various users who have viewed or edited the document, when the various users have viewed or edited the document, and the frequency with which any given user has interacted with the document. Other activity information may include relationship information between users and documents, for example, hierarchical relationships such as manager to direct report, and the like. That is, the activity store 210 may include any information about any content item that may be useful in passing the content item to the cloud system 150 and for synchronizing and merging the content item with a corresponding content item at the cloud system 150. For example, activity information showing the dates, times, and identities of users associated with a revision to a document may be used for versioning control and synchronization of the document when it is passed from the on-premises system 105 to the cloud system 150 for synchronization with a corresponding document maintained there.

Referring still to the on-premises shadowing system 205, an analysis and aggregation system 220 is illustrated for extracting content items from the content store 215 and corresponding activities from the activity store 210 for aggregating activities with corresponding content items and for generating an enterprise graph 225 from which information may be extracted for pushing to the cloud system 150, as described below. According to an embodiment, those portions or attributes of an information or other content item that are needed for synchronization at the cloud system 150 may be extracted at the on-premises system 105 for both conserving processing costs at the cloud system and for reducing the amount of information that must be transferred between the on-premises system and the cloud system.

According to an embodiment, the analysis and aggregation system 220 may aggregate activities into nodes and edges in an enterprise graph 225 in association with corresponding content items so that a detailed and complete picture of the content item is generated for sending to the cloud system 150. Operation of the analysis and aggregation system 220 is described in detail below with reference to FIG. 3. The enterprise graph 225 for a given content item will show relationships between the content item and the various content item activities such that the receiving cloud system 150 may process the received content item according to the content activities associated with the content item so that the content item may be efficiently and accurately synchronized and merged with a corresponding content item maintained at the cloud system 150. Generation of the enterprise graph 225 for a given content item is described in further detail below with respect to FIG. 3.

As should be appreciated, according to an alternative embodiment, an enterprise graph 225 may not be generated locally at the on-premises shadow system 205. Instead, all or some content items and corresponding content activities may be pushed directly to the cloud-based shadowing system 250, as described below. For example, if a given document, for example, a word processing document has very few activities items associated with it, owing to a very recent generation date, or owing to a lack of activity associated with the document, an enterprise graph 225 may not be generated for the example document, and the document along with any activities associated with the document may be pushed directly to the system 250 at the cloud system 150.

An information push client 230 is illustrated in the on-premises shadow system 205 for extracting a content item and associated activities from the enterprise graph 225 and for pushing the extracted information to the cloud system 150. As should be appreciated, the enterprise graph 225 may include a structural representation of relationships between a given content item and content activities, and thus, when the information push client 230 extracts information from the enterprise graph 225, the extracted information may be extracted pointers to the content store 215 and activity store 210 at which a given content item and associated activities may be retrieved for passing to the cloud system 150. According to one embodiment, the information push client 230 may operate in response to a pull request from the receiver API 275, described below, when a synchronization of on-premises content with cloud-based content is required.

At the lower half of FIG. 2 is illustrated a corresponding cloud-based shadowing system 250 for receiving the information pushed from the on-premises shadowing system 205 and for synchronizing and merging the received information with corresponding information maintained at the cloud system 150. In addition, the cloud-based shadowing system 250, illustrated in FIG. 2, is also responsible for retrieving content items and content activity items maintained at the cloud system 150 for synchronization and merging with corresponding information received from the on-premises system 105.

Referring to the cloud-based shadowing system 250, a client access point 252 is illustrative of an access point for accessing the services of the cloud-based shadowing system 250, as described above for the similarly enabled cloud access point 207. The general content store 260 and activity store 255 are similar in nature to the stores 210, 215 described above, and the content store 260 and activity store 255 may be used at the cloud system 150 for storing content items and content item activities associated with content items generated and stored directly at the cloud system 150, content items passed to the cloud system 150 from a remote location, for example, the on-premises system 105 or from a remote user 111 not associated with the on-premises system 105, or content items stored at the cloud system 150 after receipt from the on-premises system 105 and synchronization with cloud-based content, as described herein.

The analysis and aggregation system 265 operates at the cloud-based shadowing system 250 for analyzing and aggregating information from the content store 260 and activity store 255 in the same manner as described above for the system 220, but for analyzing and aggregating information maintained at the cloud system 150. As described above for the on-premises system 205, an enterprise graph 270 may be generated by the analysis and aggregation system 265 for creating a representation of relationships between content items and content activities that may be used for efficient and accurate synchronization and merging of cloud-based content with content received from the on-premises system 105.

Referring still to the cloud-based shadowing system 250, an information receiver application programming interface (API) 275 is illustrated for receiving information pushed to the cloud-based shadowing system 250 from the on-premises system 205. According to embodiments, the API 275 may be optimized for receiving content information and corresponding activities information and for passing the received information to a synchronization system 280 at which the received information may be synchronized and merged with corresponding content items maintained at the cloud system 150. For example, if content information and content activities received from the on-premises system 105 via the on-premises shadowing system 205 indicates that the content item is a word processing document having an activities stream indicating that the document was last viewed and modified by a given user at a specific time, the received information may be passed by the API 275 to the synchronization system 280 that may then pull corresponding information for the same document from the enterprise graph 270 for comparing the corresponding documents and corresponding activity streams associated with the corresponding documents.

According to embodiments, the API 275 may provide for error checking and error correction. As should be appreciated, occasionally information pushed to the cloud-based system 150 or pulled from the on-premises system 105 via the push client 230 and the API 275 may include errors wherein part or all of the shadowed information may be incomplete or erroneous. According to one embodiment, the information push client 230 may on a periodic basis request a status from the API 275 for one or more information transmittals to determine whether the information was accurately received by the API 275. Such an error/status check may be performed on a random basis, at a set frequency (e.g., every 10 pushed/pulled information items), or after every item is pushed/pulled to the cloud system 150 via the API 275. The status check may include a comparison of the information that was sent to the information that was received, or the status check may include other types of analysis, for example, file size comparisons, random character checks, and the like. If an error is detected, the information push client 230 may retry the information push or the API 275 may retry the information pull from the on-premises system.

By comparing the information for the corresponding documents and associated activity streams, the synchronization system 280 may synchronize and merge (if necessary) the two documents such that a most recent version of the document is saved at the cloud system 150. For example, if it is determined that the content item and activity stream received from the on-premises system 105 indicates that the content item was edited by a user at the on-premises system 105 subsequent to editing performed on the cloud-based version of the same document, such information may be stored to alert subsequent users accessing the document to the most recent version of the document and to activities associated with the document in terms of the various users and edits associated with the document.

According to one embodiment, the actual content items or content items components are not passed to the cloud-based system, but instead, pointers to the on-premises content are passed along with the activity stream that will allow the synchronization system 280 to perform content synchronization between the on-premises system and the cloud-based system where the on-premises content actually remains at the on-premises system. The synchronization system 280 may generate an index for indexing information about both the on-premises content item and the corresponding cloud-based item. Indexed information may include the aforementioned pointers to the content contained in both documents and activity stream information for both documents. According to this embodiment, future searching and analysis may be performed on the synchronized content via the cloud-based system even though some of the searched or analyzed content resides at the on-premises system. Thus, a single search or a unified analysis may be directed at a topic or content item, and the search or analysis may be applied to the original cloud-based data and the shadowed on-premises data as if both are at one location.

As should be appreciated, the components of the on-premises shadowing system 205 and the cloud-based shadowing system 250 may operate as separate components that are called upon for performing the functionality described above. Alternatively, each of the components of the system 205 may be positioned at and operate through a single server 130, 135 at the on-premises system 105, and likewise, each of the components of the cloud-based system 250 may operate at a single server 155, 160, 165, 170 positioned at the cloud system 150.

As described above with reference to FIG. 2, content items and corresponding activities may be analyzed and aggregated, and an enterprise graph 225 may be developed for assisting in synchronizing information generated, modified or otherwise interacted with at the on-premises system 105 with corresponding information at the cloud system 150. According to embodiments, analysis of content items at the on-premises system for ultimate transfer to the cloud system may include content item parsing, language detection and entity extraction such that a significant amount of content processing as part of the shadowing of content to the cloud system is performed on-premises. By aggregating information associated with a content item, as described herein, aggregated information may be pushed to the cloud-based system instead of having to send every activity, signal and/or content item component associated with an interacted with on-premises content item each time the content item interacted with in any manner. Thus, communication and synchronization latency is greatly improved.

Figure 3:
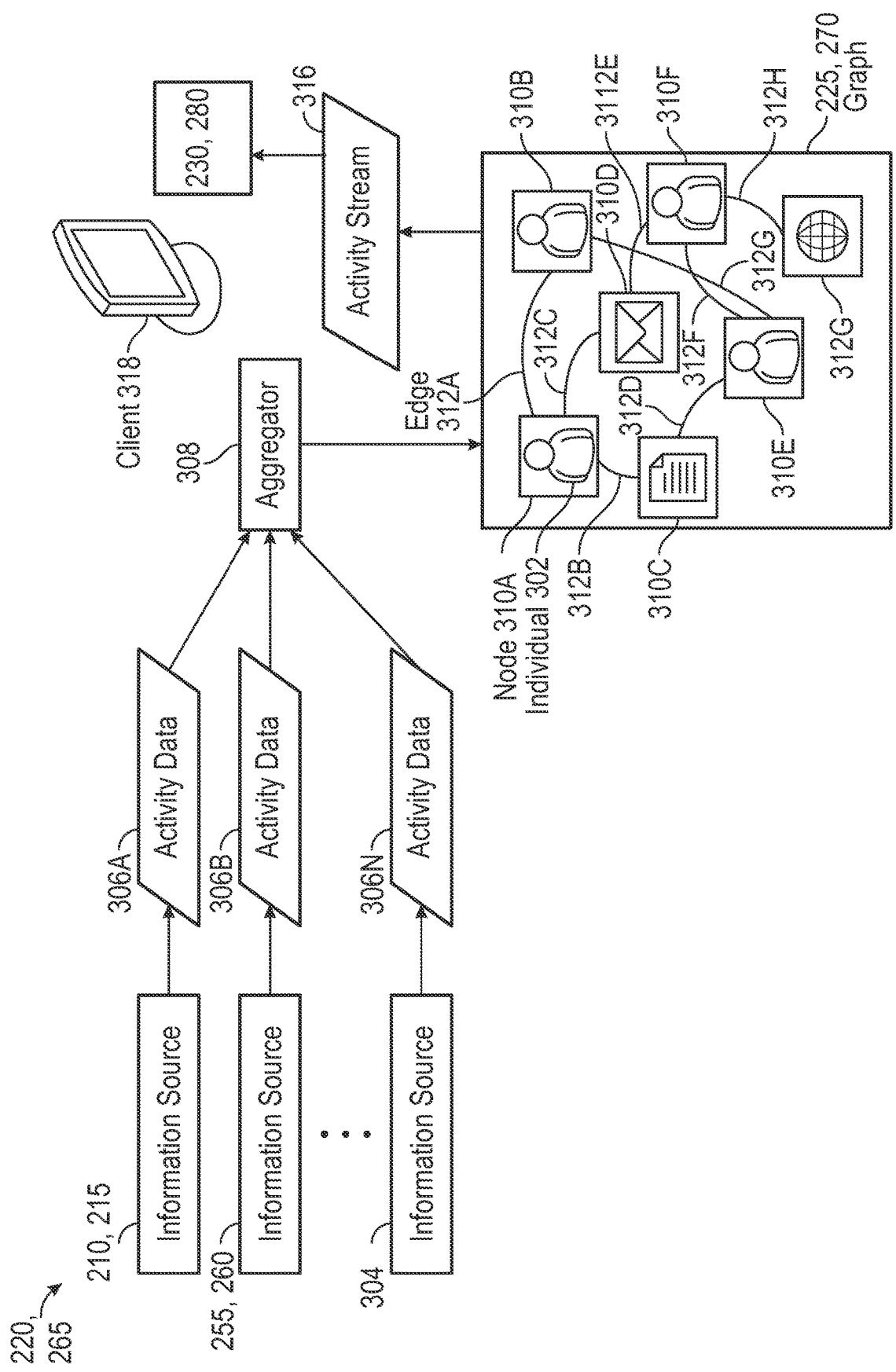
FIG. 3 is a block diagram illustrating a system for analyzing and aggregating content and activities for building an enterprise graph of the content and activities.
Figure 4:
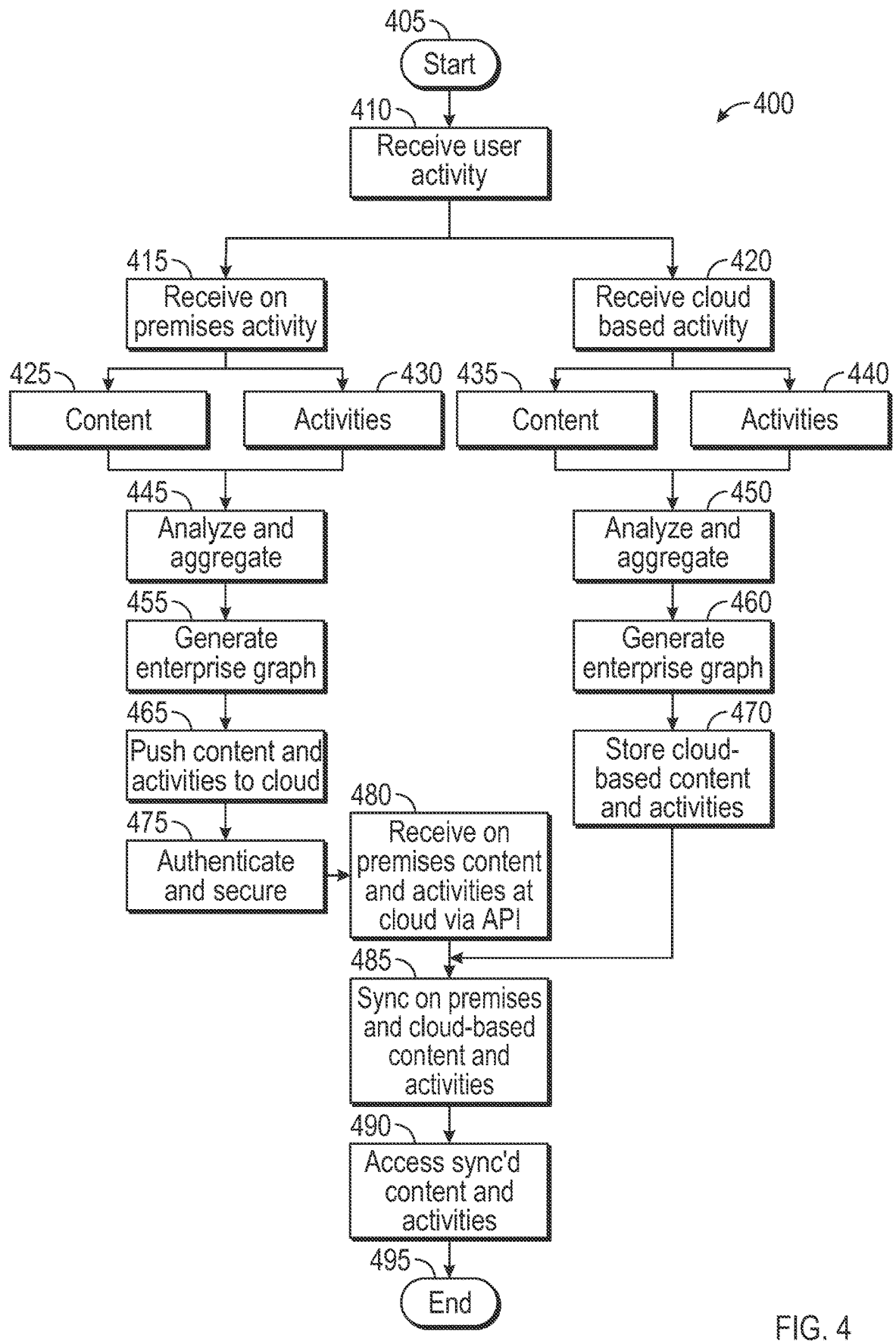
FIG. 4 is a flow diagram illustrating a method of shadowing local on-premises information to a remote cloud-based computing system.

FIG. 3 is a block diagram illustrating a system architecture 220, 265 for aggregating information items and for providing an activity stream across multiple information sources that may be built into an enterprise or knowledge graph 225, 270 from which information items may be pulled by the push client 230 and/or synchronization system 280 for passing from the on-premises system 105 to the cloud system 150 or for pulling from the cloud-based enterprise graph 225, 270 for synchronization and/or merger with information from the on-premises system. According to embodiments, the system 220, 265 may lie between the information sources 210, 215, 255, 260, 304 (on-premises and cloud-based content and activity stores) and the push client 230 or synchronization system 280 for gathering information on various information items needed for pushing information from the on-premises system to the cloud system and for ultimately synchronizing and merging information as described above. As should be appreciated, the components of the systems 220, 265 and the description thereof are for purposes of illustration only and are not restrictive of different systems and methods for aggregating information associated with a given content item for passing the aggregated information from one location to another, for example, from an on-premises site to a cloud-based site, as described herein.

The system architecture 220, 265 includes an aggregator 308 operable to collect activity data 306 A-N for one or more content items and for an individual 302 or group of individuals for generating the enterprise graph 225, 270 associated with the content items that will be pushed to the cloud system 150.

Activity data 306 A-N may comprise various types of information such as, but not limited to, presence data, data associated with authoring or modification of an information item (e.g., document), trending data, feedback data (e.g., like, comment, follow, share, etc.), data associated with organizational structure (e.g., who an individual works with, works for, interacts with, is a peer to, directs, manages, is managed by, has in common with another individual, etc.). All of such information may be useful in generating an enterprise graph 225, 270 so that a full picture of a given content item and activities associated with the content item may be developed. As should be appreciated, the process of analysis and aggregation of content items and corresponding activities may result in some activities not being included in the enterprise graph 225, 270. That is, certain activities may not be necessary for properly synchronizing a content item that is pushed to the cloud based system 150, and thus, may not be included in the enterprise graph generated for a given content item.

Referring still to the graph 225, 270, illustrated in FIG. 3, content actions may be stored as edges 312A-H (collectively 312), and entities (content items or components of content items, for example, an image in a document) that are acted upon may be stored as nodes 310A-G (collectively 310). For example, a node 310 may include an individual 302 (nodes 310A, B, E, F), a group of individuals, a document (node 310C), an email or other communication type (node 310D), a webpage (node 310G), etc. An edge 312 may include various types of actions (e.g., like, comment, follow, share, authoring, modifying, organizational relationship, communication, participation, etc.). Consider for example that an individual 302 "likes" a certain document (i.e., selects a "like" option associated with the document). The individual and the document may be stored as nodes 310 and the "like" selection may be stored as an edge 312.

The push client 230 and/or the synchronization system 280 may view/retrieve enterprise activity for a given content item. As illustrated in FIG. 3, the push client 230 and/or the synchronization system 280 may request an activity stream 316 from the enterprise graph 225, 270 for identifying content items or components and associated activities for synchronizing and/or merging content from the on-premises site 105 with corresponding content at the cloud system 150. According to one embodiment, in response to an activity on a given content item at the on-premises system 105 requiring content to be pushed to the cloud-based system 150, the push client 230 may parse the enterprise graph 225 to determine one or more components of the content item and one or more of the one or more activities associated with the content item that should be pushed to the cloud-based computing system in response to the activity.

That is, as should be appreciated, some or all information in the activity stream may need to be pushed to the cloud system 150. For example, for a given document, a single object in the document, such as a chart in a spreadsheet document, may have been edited at the on-premises system 105. According to embodiments, the edited object and activities associated with the object (e.g., who edited the object, when the object was edited, etc.) may be aggregated in an activity stream 316. Consequently, when the spreadsheet document is pushed to the cloud system 150, only the edited object and associated activities may need to be pushed to the cloud system for synchronization with the corresponding document at the cloud system 150.

Having described an example operating environment for and various aspects of embodiments of the present invention with reference to FIGS. 1-3, FIG. 4 is a flow diagram illustrating a method of shadowing local on-premises information to a remote cloud-based computing system. The method 400 begins at start operation 405 and then proceeds to operation 410 where user activity associated with a content item is received. For example user activity may be the generation of a document or other content item, the modification of a document or other content item, the viewing of a content item, the commenting on a content item via a social networking site, the emailing or texting of a content item, the receipt of a content item through an electronic communications system, and the like.

If the user activity is received at the on-premises system 105, the routine proceeds to operation 415, and the content item interacted with by the user is stored in the content store 215 at the on-premises system 105, and at operation 430 any user activities associated with the content item are stored at the activity store 210. At operation 445, the content item and activities associated with the content item are analyzed and aggregated by the analysis and aggregation system 220, described above with reference to FIG. 3. At operation 455, an enterprise graph providing relationships between the content item and associated activities is generated.

At operation 465, the information push client 230 extracts information from the enterprise graph 270 for determining those content items and activity items that should be extracted from the content store 215 and activity store 210 for pushing to the cloud-based shadow system 250, as described above with reference to FIG. 2. At operation 475, if required, an authentication system may be activated and passed by the push client 230 for pushing information from the on-premises system 105 to the cloud system 150.

At operation 480, the content items and associated activity items pushed from the on-premises shadowing system 205 are received by the information receiver API 275 at the cloud-based shadowing system 250, as described above with reference to FIG. 2. As described above, according to one embodiment, the actual content items or content items components are not passed to the cloud-based system, but instead, pointers to the on-premises content is passed along with the activity stream that will allow the synchronization system 280 to perform content synchronization between the on-premises system and the cloud-based system where the on-premises content actually remains at the on-premises system.

Referring back to operation 410, if the initially received user activity is cloud-based activity, that is, where the user interacted directly with the cloud system 150, or where a user 111 external to the on-premises system 105 sends information directly to the cloud system 150, the routine proceeds to operation 420 where the cloud-based user activity is received. At operation 435, one or more content items generated, modified, or otherwise interacted with by the user are stored in the content store 260, and at operation 440, activities associated with the content items are stored in the activity store 255. At operation 450, the cloud-based content and activities may be analyzed and aggregated, and at operation 460, an enterprise graph 270 may be generated for the analyzed and aggregated cloud-based content and associated activities. At operation 470, the cloud-based content and activities and the generated enterprise graph may be stored for subsequent synchronization with corresponding content and activities received from the on-premises system 105.

Referring now to operation 485, received on-premises content and activities via the API 275 are passed to the synchronization system 280 for synchronization with content and activities stored at the cloud system 150 corresponding to the received content and activities. For example, if a received content item and associated activities indicates various edits to the received content item, the synchronization system 280 may save or merge the edits and activities to/with the cloud-based content item so that the cloud-based content item will be up-to-date for use by subsequent users. According to one embodiment, after synchronizing the content item and the one or more activities associated with the content item with a corresponding cloud-based content item, the synchronized content item and one or more activities associated with the synchronized content item may be stored at the content store 260 and activities store 255 for subsequent access. In addition, the synchronization system 280 may perform versioning control operations for ensuring that edits to content items received from various sources do not conflict. As should be appreciated, the activity information received with the content item from the on-premises system 105 will allow the synchronization system 280 to understand the nature, timing and authorship of edits or other interactions with a received content item.

In addition to storing the synchronized content item, the content item and associated activities received from the on-premises system are stored, and the synchronized content item, the content item and associated activities received from the on-premises system, as well as, cloud-based content and activities corresponding to the synchronized content item and on-premises content item are indexed at the cloud system 150. Thus, searches for data items or objects directed to any of these content items may be directed to the indexed information which allows for a single index to search. Thus, search alignment and refinement is greatly improved, and the ability to avoid duplicate search results across two systems also is greatly improved.

At operation 490, access to the synchronized content and activities may be enabled from a user 110 operating from an on-premises system 105 and/or from a user 111 operating external to the on-premises system 105. In response to receiving a request for access to the synchronized content item, the synchronized content item may be provided in any suitable user interface appropriate for the content item, for example, a word processing application user interface. An accessing user may then view, modify, or otherwise interact with the synchronized content item, and a revised version of the synchronized content item may be stored at the content store (if necessary) for future access and for future synchronization with content received from the on-premises system.

In the case where the on-premises content stays on-premises, but a shadow of the on-premises content is passed to the cloud system, a single search or analysis may be performed and the content at both the on-premises system and the cloud system may be searched and analyzed as if all the content is at a single location. In addition, if a user accesses a content item that is still stored at the on-premises system, but for which an information shadow has been passed to the cloud-based system as described herein, the user's search may retrieve the on-premises content as if the content is available at the cloud-based system owing to the indexing of the on-premises content and associated activities at the cloud system. If the user modifies such a content item, changes may be made to the on-premises version, the cloud-based version or both. And, if the user modifies an on-premises based content item, then the shadowing process described herein will be activated for the interacted with content. Thus, by shadowing content and associated activities from an on-premises system 105 to a cloud system 150, as described herein, latency between information generated, modified or otherwise interacted with at the on-premises system 105 and corresponding information passed to, processed by and stored at the cloud system 150 is greatly reduced, and subsequent access to content items stored at the cloud system 150 include information and most recent modifications as applied to them by users outside the cloud system 150.

As should be appreciated, the process of shadowing information from the on-premises system 105 to the cloud system 150 may be performed on a regular and frequent basis where the frequency of the shadowing operation may be tuned or modified as required for the most efficient passing of information between the two systems. Alternatively, computing systems at the on-premises system 105 may be set to automatically call on the services of the shadowing system 205 each time content is generated, modified or otherwise interacted with at the on-premises system so that content is automatically synchronized and/or merged with corresponding content at the cloud system 150. The method 400 ends at operation 495.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
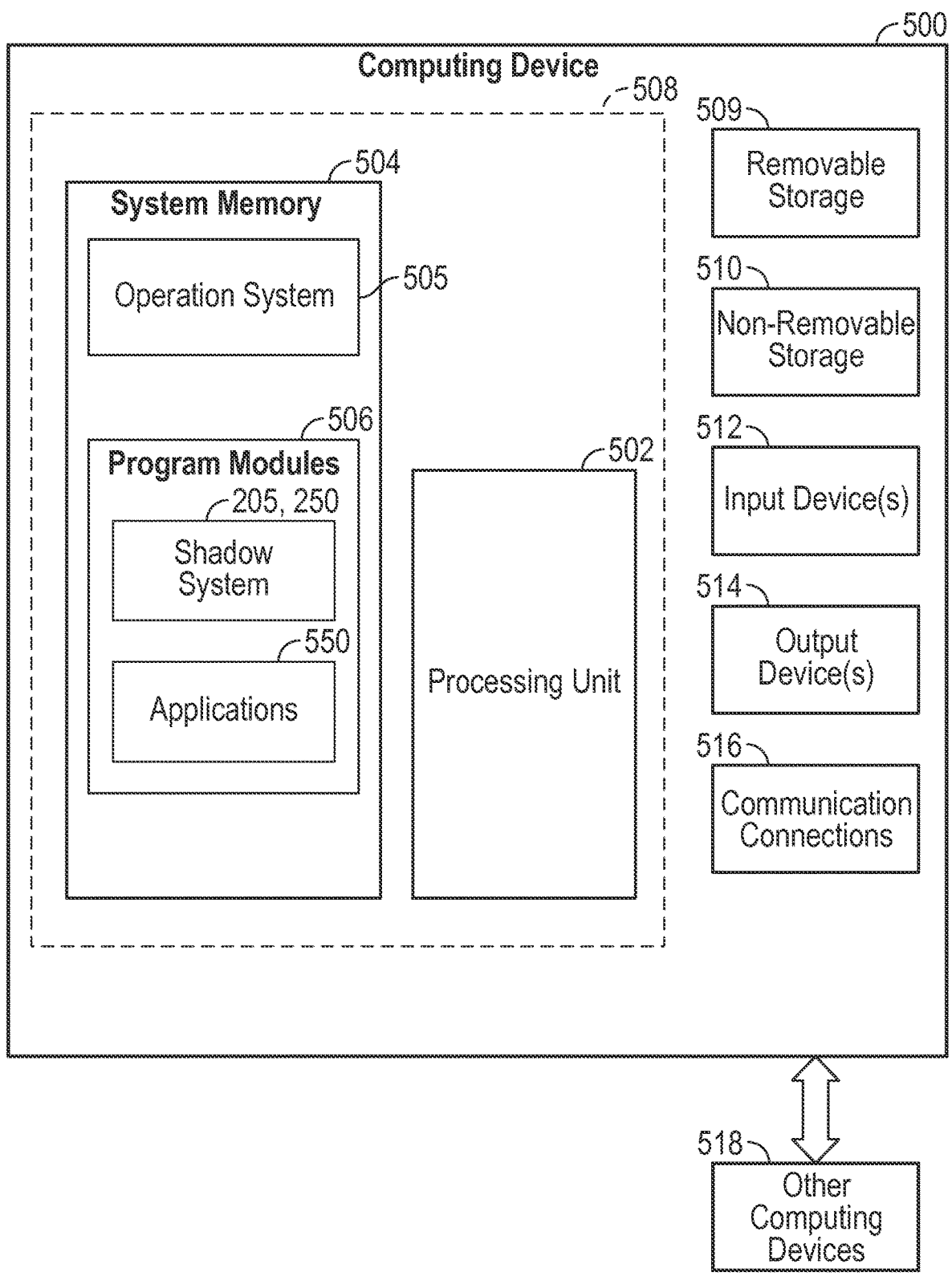
FIG. 5 is a block diagram illustrating example physical components of a computing device with which embodiments of the invention may be practiced.
Figure 6A:
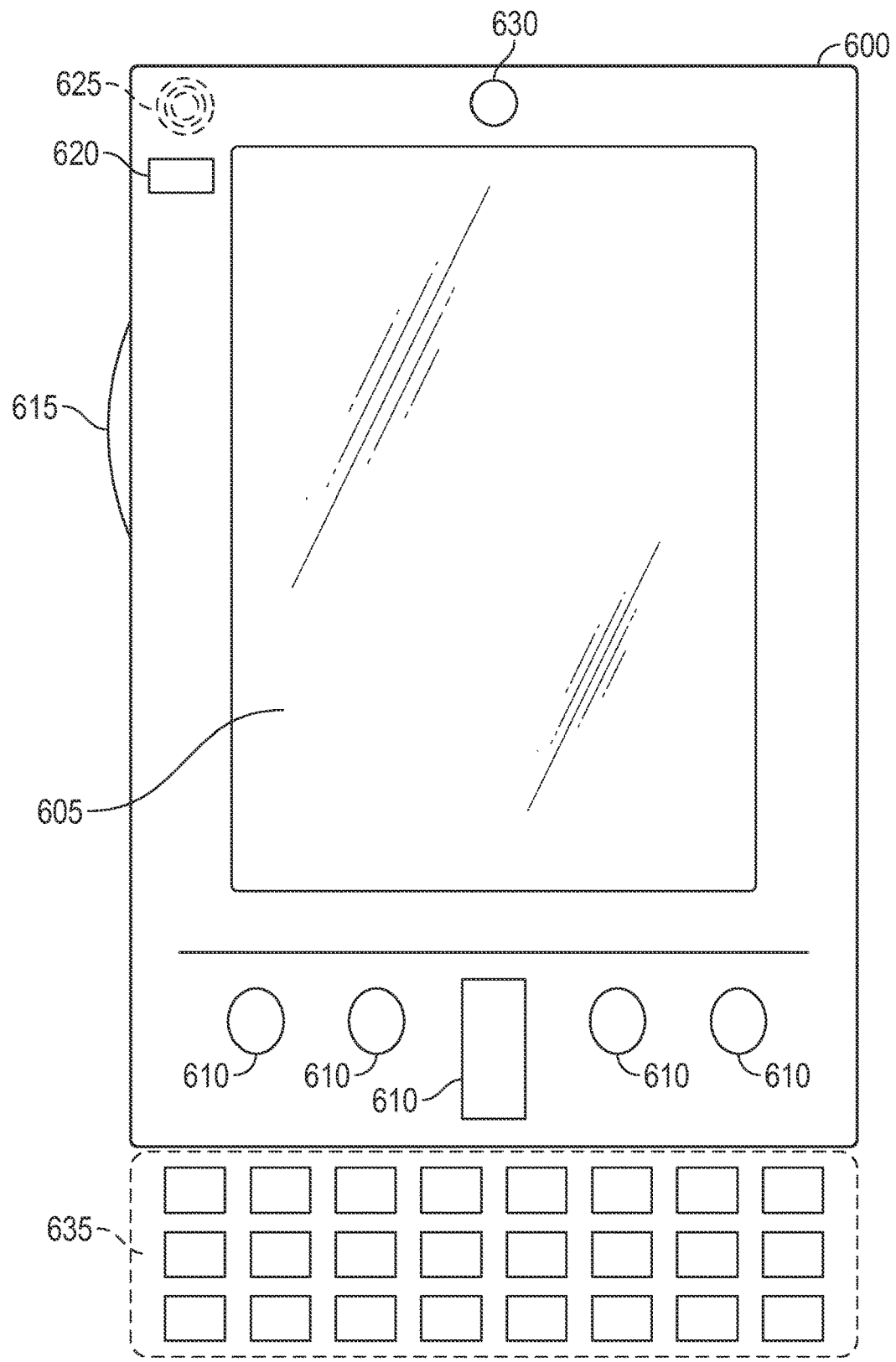
FIGS. 6A and 6B are simplified block diagrams illustrating components of a mobile computing device with which embodiments of the invention may be practiced.
Figure 6B:
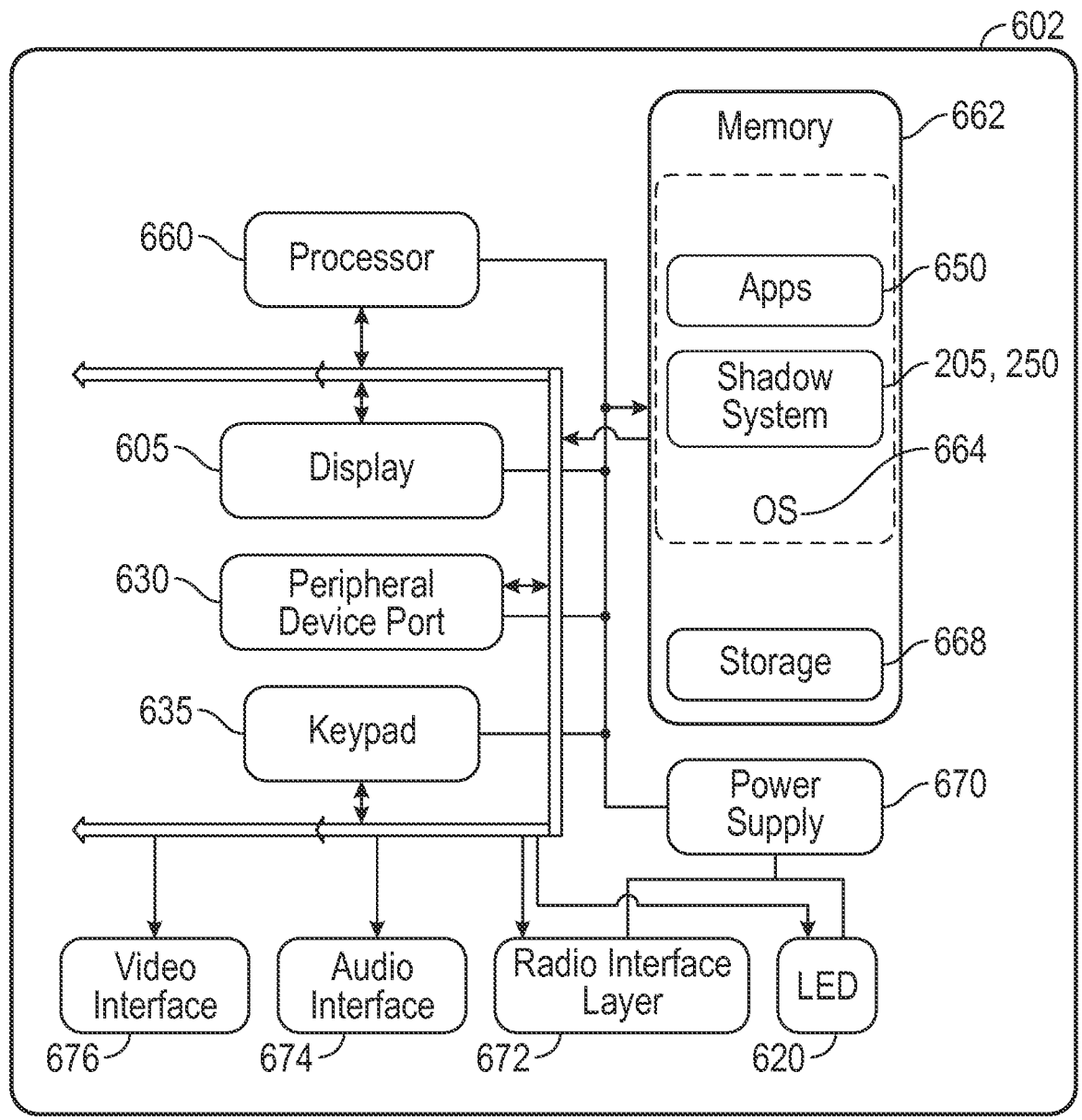
Figure 7:
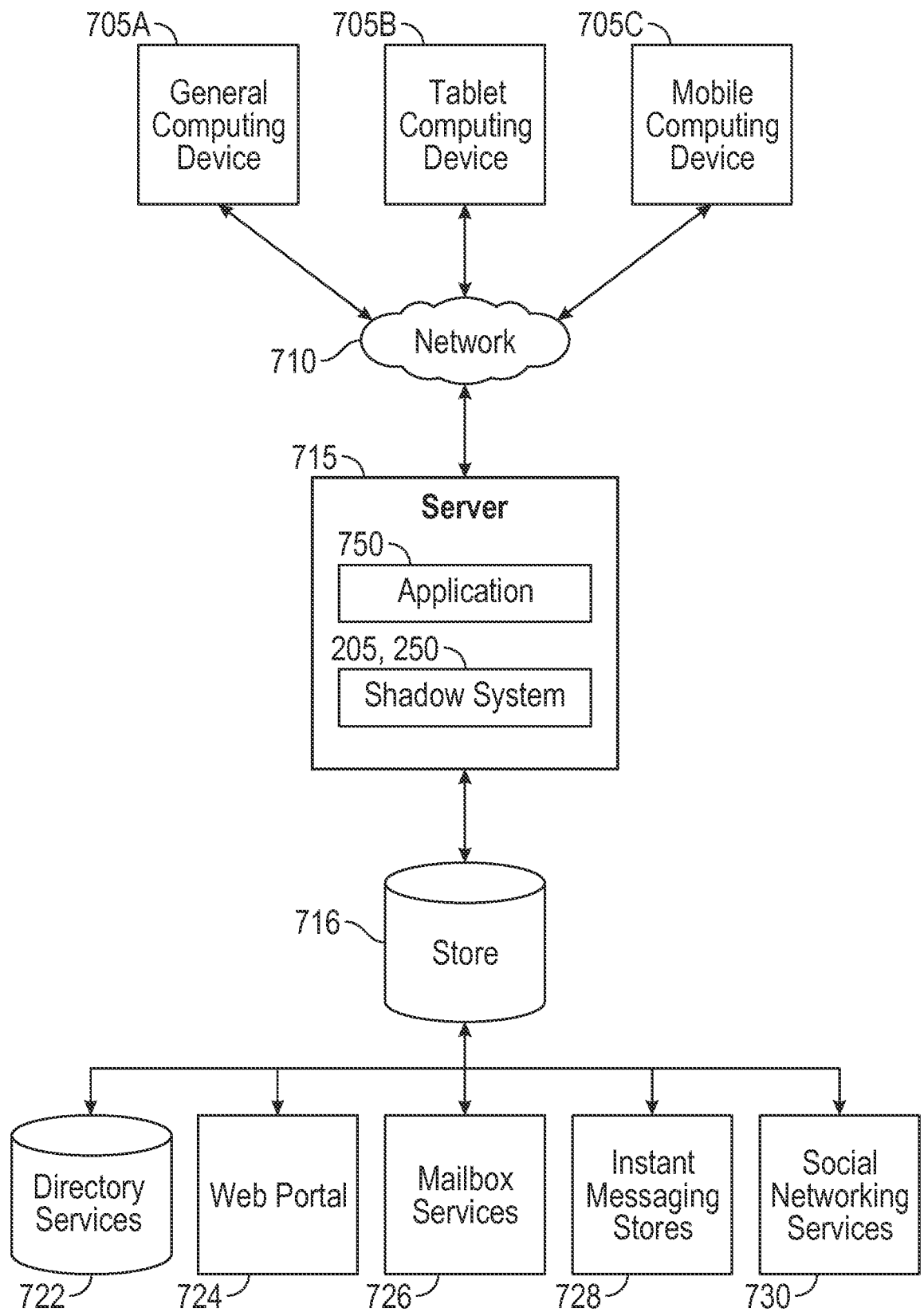
FIG. 7 is a simplified block diagram of a distributed computing system in which embodiments of the invention may be practiced.

FIGS. 5-7 and the associated descriptions provide a discussion of a variety of operating environments in which embodiments of the invention may be practiced. However, the devices and systems illustrated and discussed with respect to FIGS. 5-7 are for purposes of example and illustration and are not limiting of a vast number of computing device configurations that may be utilized for practicing embodiments of the invention, described herein.

FIG. 5 is a block diagram illustrating physical components (i.e., hardware) of a computing device 500 with which embodiments of the invention may be practiced. The computing device components described below may be suitable for the client devices and servers described in reference to FIG. 1. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 550 such as the shadowing systems 205, 250 or one or more client applications, such as word processing applications, spreadsheet applications, slide presentation applications, and the like. The operating system 505, for example, may be suitable for controlling the operation of the computing device 500. Furthermore, embodiments of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including, but not limited to, one or more of the stages of the method 400 illustrated in FIG. 4. Other program modules that may be used in accordance with embodiments of the present invention and may include applications such as electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing an activity stream across multiple workloads may be operated via application-specific logic integrated with other components of the computing device 500 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which embodiments of the invention may be practiced. With reference to FIG. 6A, one embodiment of a mobile computing device 600 for implementing the embodiments is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative embodiments, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some embodiments, the mobile computing device 600 incorporates a vibration transducer for providing the user with tactile feedback. In yet another embodiment, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one embodiment of a mobile computing device. That is, the mobile computing device 600 can incorporate a system (i.e., an architecture) 602 to implement some embodiments. In one embodiment, the system 602 is implemented as a "smart phone" capable of running one or more applications (e.g., browser, e-mail, calendaring, contact managers, messaging clients, games, and media clients/players). In some embodiments, the system 602 is integrated as a computing device, such as an integrated personal digital assistant (PDA) and wireless phone.

One or more application programs 650 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The shadow system 205, 250 and other application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

The visual indicator 620 may be used to provide visual notifications and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present invention, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one embodiment of the architecture of a system for providing an activity stream across multiple workloads, as described above. Content developed, interacted with, or edited in association with the shadowing systems 205, 255 may be stored in different communication channels or other storage types. For example, various documents may be stored using a directory service 722, a web portal 724, a mailbox service 726, an instant messaging store 728, or a social networking site 730. The shadowing systems 205, 255 may use any of these types of systems or the like for providing shadowed content, as described herein. A server 130 may provide the shadow system 205, 250 or other applications 750 to clients 125. As one example, the server 715 may be a web server providing content over the web. The server 715 may provide the information from the system 205 over the web through a network 710. By way of example, the client computing devices illustrated and described with reference to FIG. 1 may be implemented and embodied in a personal computer 705A, a tablet computing device 705B and/or a mobile computing device 705C (e.g., a smart phone), or other computing device. Any of these embodiments of the client computing device may obtain content from the store 716 such as the stores 210, 215, 255, 260 described above.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A computer-implemented method of synchronizing an on-premises computing system with a cloud-based computing system, comprising:
at the on-premises computing system:
storing a plurality of content items in an on-premises content store, the plurality of the content items comprising a document, the document not being stored on the cloud-based computing system;
storing activity data associated with the document in an on-premises activity store, the activity data comprising at least one of: a document type, a document author, a document editor, a document creation date, a document revision date, or a user identifier of a non-author associated with a document;
aggregating content from the on-premises content store and the on-premises activity store to generate an on-premises enterprise graph;
periodically assessing the on-premises enterprise graph;
based on the assessment of the on-premises enterprise graph:
determining that a plurality of activities relating to the document have occurred, the plurality of activities having caused a change in the document and being stored in the on-premises content store; and
extracting and aggregating:
a pointer to the document in the on-premises content store; and
one or more portions of the activity data in the on-premises activity store;
transmitting the pointer and the one or more portions of the activity data from the on-premises computer system to the cloud-based computing system; and
at the cloud-based computing system:
receiving the pointer and the one or more portions of the activity data;
updating a cloud-based enterprise graph to reflect the one or more portions of the activity data;
storing the one or more portions of the activity data in a cloud-based activity store;
storing the pointer in a cloud-based content store;
generating an index of the one or more portions of the activity data in the cloud-based activity store and the pointer in the cloud-based content store;
receiving a query of the index; and
producing results of the query that include the document based on the pointer in the cloud-based content store pointing to the document in the on-premises computing system.

2. The method of claim 1, further comprising, receiving at the on-premises computing system a transmit instruction from the cloud-based computing system to transmit the document to the cloud-based computing system, wherein the transmit instruction is based on the cloud-based computing system having received the pointer.

3. The method of claim 1, further comprising, receiving, at the on-premises computing system from the cloud-based computing system, a request for a status, wherein the status relates to the transmission received by the cloud-based computing system.

4. The method of claim 1, wherein periodically assessing the on-premises enterprise graph is performed automatically, without user-instructed activation, on a timed periodic basis.

5. The method of claim 1, wherein periodically assessing the on-premises enterprise graph is performed in response to user-instructed activation.

6. A system to synchronize an on-premises computing system with a cloud-based computing system, the system comprising:
an on-premises computing system having a memory storing executable first instructions and a processor for executing the first instructions; and
a cloud-based computing having a memory storing executable second instructions and a processor for executing the second instructions;
wherein the first instructions of the on-premises computing system cause the processor of the on-premises computing system to:
store a plurality of content items in an on-premises content store, the plurality of the content items comprising a document, the document not being stored on the cloud-based computing system;

store activity data associated with the document in an on-premises activity store, the activity data comprising at least one of: a document type, a document author, a document editor, a document creation date, a document revision date, or a user identifier of a non-author associated with a document;

aggregate content from the on-premises content store and the on-premises activity store to generate an on-premises enterprise graph;

periodically assess the on-premises enterprise graph;

based on the assessment of the on-premises enterprise graph:
  determine that a plurality of activities relating to the document have occurred, the plurality of activities having caused a change in the document and being stored in the on-premises content store; and
  extract and aggregate:
    a pointer to the document in the on-premises content store; and
    the activity data in the on-premises activity store;

transmit the aggregation of the plurality of activities related to the specific one of the documents and the pointer from the on-premises computer system to the cloud-based computing system; and wherein the instructions of the cloud-based computing system cause the processor of the cloud-based computing system to:
receive the pointer and the activity data;
update a cloud-based enterprise graph to reflect the activity data;
store the activity data in a cloud-based activity store;
store the pointer in a cloud-based content store;
generate an index of the activity data in the cloud-based activity store and the pointer in the cloud-based content store;
receive a query of the index; and
produce results of the query that include the document based on the pointer in the cloud-based content store pointing to the document in the on-premises computing system.

7. The system of claim 6, wherein the processor is further caused to:
receive at the on-premises computing system, a transmit instruction from the cloud-based computing system to transmit the document to the cloud-based computing system, wherein the transmit instruction is based on the cloud-based computing system having received the pointer.

8. The system of claim 6, wherein the processor is further caused to:
receive at the on-premises computing system, from the cloud-based computing system, a request for a status, wherein the status relates to a previous transmission received by the cloud-based computing system.

9. The system of claim 6, wherein the periodic assessment of the on-premises enterprise graph is performed automatically, without user-instructed activation, on a timed periodic basis.

10. The system of claim 6, wherein periodic assessment of the on-premises enterprise graph is performed in response to user-instructed activation.

11. Computer storage media storing computer-executable instructions that cause synchronization of an on-premises computing system with a cloud-based computing system, the instructions comprising:
instructions to the on-premises computing system to:
store a plurality of content items in an on-premises content store, the plurality of the content items comprising a document, the document not being stored on the cloud-based computing system;
store activity data associated with the document in an on-premises activity store, the activity data comprising at least one of: a document type, a document author, a document editor, a document creation date, a document revision date, or a user identifier of a non-author associated with a document;
aggregating content from the on-premises content store and the on-premises activity store to generate an on-premises enterprise graph;
periodically assess the on-premises enterprise graph;
based on the assessment of the on-premises enterprise graph:
  determine that a plurality of activities relating to the document have occurred, the plurality of activities having caused a change in the document and being stored in the on-premises content store; and
  extract and aggregate:
    a pointer to the document in the on-premises content store; and
    the activity data in the on-premises activity store;
transmit the pointer and the activity data from the on-premises computer system to the cloud-based computing system; and
instructions to the cloud-based computing system to:
receive the pointer and the activity data;
update a cloud-based enterprise graph to reflect the activity data;
store the activity data in a cloud-based activity store;
store the pointer in a cloud-based content store;
generate an index of the activity data in the cloud-based activity store and the pointer in the cloud-based content store;
receive a query of the index; and
produce results of the query that include the document based on the pointer in the cloud-based content store pointing to the document in the on-premises computing system.

12. The computer storage media of claim 11, wherein the instructions further comprise an instruction to:
receive at the on-premises computing system, a transmit instruction from the cloud-based computing system to transmit the document to the cloud-based computing system, wherein the transmit instruction is based on the cloud-based computing system having received the pointer.

13. The computer storage media of claim 11, wherein the instructions further comprise an instruction to:
receive at the on-premises computing system, from the cloud-based computing system, a request for a status, wherein the status relates to a previous transmission received by the cloud-based computing system.

14. The computer storage media of claim 11, wherein the periodic assessment of the on-premises enterprise graph is performed automatically, without user-instructed activation, on a timed periodic basis.

15. The computer storage media of claim 11, wherein periodic assessment of the on-premises enterprise graph is performed in response to user-instructed activation.

16. The method of claim 1, wherein the one or more portions of the activity data represent one or more modifications to the document, the one or more modifications to the document not being provided to the cloud-based computing system prior to the extracting and aggregating the one or more portions of the activity data in the on-premises activity store.

17. The method of claim 1, wherein storing the one or more portions of the activity data in a cloud-based activity store and storing the pointer in a cloud-based content store synchronizes the activity data associated with the document between the on-premises computing system and the cloud-based computing system.

* * * * *